J. HASKELL.
Cultivator.
No. 62,329.
Patented Feb. 26, 1867.
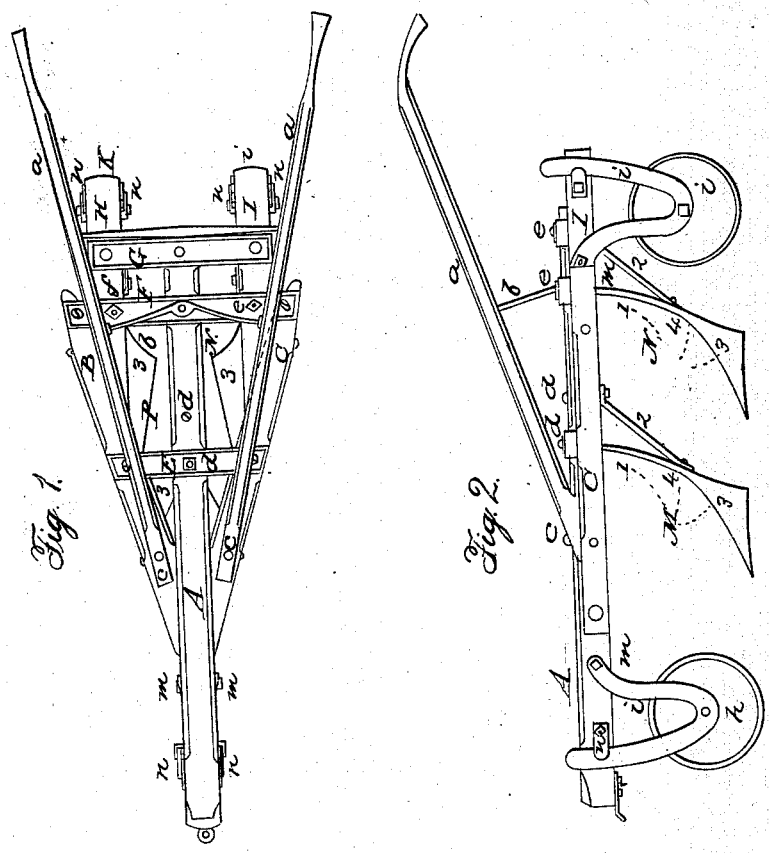
Witnesses.
Edward P. ——
Henry C. ——
Inventor.
Jarius Haskell
by his atty
Wm Henry Clifford

United States Patent Office.

JAIRUS HASKELL, OF LISBON, MAINE.

Letters Patent No. 62,329, dated February 26, 1867.

---

IMPROVEMENT IN CULTIVATORS.

---

*The Schedule referred to in these Letters Patent and making part of the same.*

---

TO ALL WHOM IT MAY CONCERN:

Be it known that I, JAIRUS HASKELL, of Lisbon, in the county of Androscoggin, and State of Maine, have invented certain new and useful improvements in Cultivators; and I hereby declare the following to be a full, clear, and exact description thereof, which will enable others to make and use my invention, reference being had to the accompanying drawings, forming part of this specification, in which—

Figure 1 shows a top plan and view of my invention.

Figure 2, a side elevation of the same.

Same letters show like parts.

The object of my invention is to provide a cultivator of a particular construction, with a means of regulating and gauging the depth to which its teeth shall enter the soil, and to provide a means for accurately gauging the depth of this entrance in the manner and by the means hereinafter more fully set forth and described, and for other purposes. The frame of my improved cultivator is composed of a centre beam, two side pieces, three cross-braces, and two beams which I call splice beams.

A shows the centre beam; B C the two side pieces; E F G the cross-braces, and H I the splice beams. Upon this frame are placed the arms and handles, bolted and braced as is common. $a$ shows the handles, $b$ the braces, and $c$ the bolting of the arms. The frame thus composed is of an A-shape. Three teeth are fitted to this frame, one on the centre beam, at $d$, and one on each of the splice beams, at $e f$. These teeth are secured by passing through the beams of the frame to which they are attached, and then being secured by nuts, the shanks of the teeth being made to pass through the longitudinal and cross-beams of the frame at their intersection, where this is possible, and thus form also a bolt to unite the different parts of the implement, for instance, as at $d f$ and $e$. These teeth are made quite long, being sixteen or eighteen inches, or even two feet high, and are composed of three parts, the shank 1, the brace 2, and share 3. The share is made of a diamond-shaped sheet or plate of metal, longer than it is wide, and curved downward from the middle to each side; the shape is well illustrated in the drawing. This is riveted to the shank 1 at 4, as seen in the drawing. To the back side of the shank 1 is riveted the brace 2, as illustrated. By these means the teeth are secured. Two teeth are placed behind, and one in front of these two, and in front of the space between them. (See fig. 1.) Upon the forward end of the centre beam A is attached the wheel $h$, by the adjustable gauge $i$. Upon each of the splice beams H I are also attached wheels, one on each beam, at $j k$, and by similar means. Thus the frame of the implement is capable of being borne on its wheels $h, j, k$. The wheel $h$ passes over that part of the soil immediately afterward turned up by the tooth M, and the wheels $j$ and $k$ run in the furrows made by the teeth N P. The gauges $i$ have pivots, $m$, upon which they can be turned, and by which they are secured, and slide in clamps or clasps, $n$, and are by these clamps held at any point desired, so that the wheels can be lifted up or lowered as occasion may require. The object of this arrangement of the wheels and teeth, to wit, the wheel $h$ in front of the tooth M, and the wheels $j$ and $k$, directly behind the teeth N and P, is as follows: first, to provide a means by which the depth of the entrance of the teeth into the soil can be accurately regulated; second, to enable the implement to have its frame so far raised above the surface of the ground that the liability of the teeth to become loaded and clogged with various substances, such as weeds, clods, &c., is wholly or nearly obviated. This object my invention accomplishes by the following combination and arrangement, to wit, the combination and arrangement of the three wheels and the three teeth, together with the height or length of the teeth, and the position, relative to the teeth, of the three wheels by which the depth of the penetration of the teeth into the soil can be accurately regulated. The position of the two rear wheels $j k$ is owing to the manner of the attachment of the two splice beams H I, which are chamfered off so that when united to the inner sides of B and C, they (H and I) are parallel to the centre beam A. In order exactly to regulate the depth of penetration of the teeth, it must be borne in mind that the wheel $h$ passes over the unbroken soil, while the wheels $j$ and $k$ run in the furrows, therefore $j$ and $k$ must always be dropped as much lower than $h$ as the furrows are deep.

The use to which my invention is intended to be devoted is for loosening and cultivating the soil between rows of growing products, and for further breaking and pulverizing the soil after having been ploughed.

I do not claim the method of constructing the frame, nor its form; neither do I claim the construction of the teeth, or the method of their attachment; neither do I claim a cultivator, the depth of whose furrows can be regulated by adjustable wheels or trucks; neither do I claim the wheels or the gauges $i$ or the clamps $n$; neither do I claim the combination of the wheels with the adjustable gauges $i$. By the arrangement of the splice beams H I, the two rear wheels $j$ and $k$ are enabled to be placed in the best position for the accurate gauging of the implement, which could not be so effectually attained were they placed, for instance, on the flaring side beams.

But what I do claim, and desire to secure by Letters Patent, is—

1. The combination of the three wheels $h$, $j$, $k$, having their gauges $i$, pivots $m$, and clamps $n$, with the elongated teeth M N P, when the same are arranged in positions relative to each other on a cultivator frame of the described form, in the manner and for the purposes set forth.

2. The combination of the splice beams H I with the two rear wheels $j$ and $k$ attached and adjustable as set forth, when the two beams H I are connected with the beams B C in the manner and for the purposes described.

JAIRUS HASKELL.

Witnesses:
WILLIAM HENRY CLIFFORD,
HENRY C. HOUSTON.